US009759202B2

(12) United States Patent
Hyde et al.

(10) Patent No.: US 9,759,202 B2
(45) Date of Patent: Sep. 12, 2017

(54) METHOD FOR GENERATION OF POWER FROM INTRALUMINAL PRESSURE CHANGES

(75) Inventors: Roderick A. Hyde, Redmond, WA (US); Muriel Y. Ishikawa, Livermore, CA (US); Eric C. Leuthardt, St. Louis, MO (US); Michael A. Smith, Phoenix, AZ (US); Lowell L. Wood, Jr., Bellevue, WA (US); Victoria Y. H. Wood, Livermore, CA (US)

(73) Assignee: DEEP SCIENCE, LLC, Bellevue, WA (US)

( * ) Notice: Subject to any disclaimer, the term of this patent is extended or adjusted under 35 U.S.C. 154(b) by 1383 days.

(21) Appl. No.: 12/315,616

(22) Filed: Dec. 4, 2008

(65) Prior Publication Data
US 2010/0140956 A1    Jun. 10, 2010

(51) Int. Cl.
| | | |
|---|---|---|
| *B60L 11/02* | (2006.01) | |
| *B61C 9/38* | (2006.01) | |
| *H02K 23/52* | (2006.01) | |
| *F03G 7/04* | (2006.01) | |
| *F02B 63/04* | (2006.01) | |
| *F03G 7/08* | (2006.01) | |

(52) U.S. Cl.
CPC ....................... *F03G 7/04* (2013.01)

(58) Field of Classification Search
USPC .............. 290/1 R, 10; 600/16; 607/35
See application file for complete search history.

(56) References Cited

U.S. PATENT DOCUMENTS

| | | | | |
|---|---|---|---|---|
| 3,358,690 | A | * | 12/1967 | Cohen .............................. 607/23 |
| 3,421,512 | A |   | 1/1969  | Frasier ........................... 607/35 |
| 3,456,134 | A |   | 7/1969  | Ko ................................... 607/35 |
| 3,522,811 | A | * | 8/1970  | Wingrove et al. .............. 607/27 |
| 3,563,245 | A |   | 2/1971  | McLean et al. ................ 607/35 |
| 3,649,615 | A |   | 3/1972  | Ikeda et al. .................... 534/642 |
| 3,659,615 | A |   | 5/1972  | Enger ............................. 607/35 |
| 3,861,397 | A | * | 1/1975  | Rao et al. ....................... 607/35 |
| 3,906,960 | A | * | 9/1975  | Lehr ................................ 607/35 |
| 3,943,936 | A |   | 3/1976  | Rasor et al. ..................... 607/5 |
| 4,140,132 | A |   | 2/1979  | Dahl ................................ 607/19 |
| 4,294,891 | A | * | 10/1981 | Yao et al. ........................ 429/2 |

(Continued)

FOREIGN PATENT DOCUMENTS

| | | |
|---|---|---|
| GB | 1220677 | 1/1971 |
| GB | 2350302 | 11/2000 |

OTHER PUBLICATIONS

Franklin Hadley, Goodbye Wires . . . , MIT News, Jun. 7, 2007, Publisher: http://web.mit.edu/newsoffice/2007/wireless-0607.html, Published in: US.

(Continued)

*Primary Examiner* — Tulsidas C Patel
*Assistant Examiner* — Pedro J Cuevas
(74) *Attorney, Agent, or Firm* — Faisal K. Abou-Nasr; Advent, LLP

(57) ABSTRACT

A method for extracting power from intraluminal pressure changes may comprise one or more of the following steps: (a) receiving an intraluminal pressure change; (b) converting the intraluminal pressure change into energy with an intraluminal generator; and (c) storing the energy in an energy storage apparatus.

11 Claims, 11 Drawing Sheets

(56) References Cited

U.S. PATENT DOCUMENTS

| | | | |
|---|---|---|---|
| 4,453,537 A * | 6/1984 | Spitzer | 623/3.12 |
| 4,661,107 A * | 4/1987 | Fink | 623/2.34 |
| 4,690,143 A | 9/1987 | Schroeppel | 607/5 |
| 4,798,206 A | 1/1989 | Maddison et al. | 607/122 |
| 5,007,927 A * | 4/1991 | Badylak et al. | 623/3.12 |
| 5,010,893 A | 4/1991 | Sholder | 600/595 |
| 5,154,680 A | 10/1992 | Drzewiecki et al. | 600/485 |
| 5,205,286 A | 4/1993 | Soukup et al. | 600/377 |
| 5,344,385 A * | 9/1994 | Buck et al. | 600/16 |
| 5,348,019 A | 9/1994 | Sluss, Jr. et al. | 600/480 |
| 5,363,855 A | 11/1994 | Drzewiecki et al. | 600/485 |
| 5,411,537 A * | 5/1995 | Munshi et al. | 607/33 |
| 5,431,694 A | 7/1995 | Snaper et al. | 607/35 |
| 5,443,504 A * | 8/1995 | Hill | 623/3.12 |
| 5,457,624 A | 10/1995 | Hastings | |
| 5,535,752 A | 7/1996 | Halperin et al. | 600/483 |
| 5,617,876 A | 4/1997 | van Duyl | 600/595 |
| 5,626,141 A | 5/1997 | Takeda | 600/490 |
| 5,653,676 A * | 8/1997 | Buck et al. | 600/16 |
| 5,690,693 A * | 11/1997 | Wang et al. | 607/61 |
| 5,693,952 A | 12/1997 | Cox | 250/551 |
| 5,701,919 A * | 12/1997 | Buck et al. | 128/898 |
| 5,702,431 A * | 12/1997 | Wang et al. | 607/61 |
| 5,713,939 A * | 2/1998 | Nedungadi et al. | 607/33 |
| 5,715,837 A | 2/1998 | Chen | 128/899 |
| 5,734,564 A | 3/1998 | Brkovic | |
| 5,745,358 A | 4/1998 | Faulk | |
| 5,749,909 A * | 5/1998 | Schroeppel et al. | 607/33 |
| 5,764,495 A | 6/1998 | Faulk | |
| 5,810,015 A | 9/1998 | Flaherty | 128/897 |
| 5,823,199 A | 10/1998 | Hastings et al. | 128/899 |
| 5,954,058 A | 9/1999 | Flaherty | 128/899 |
| 5,984,857 A * | 11/1999 | Buck et al. | 600/16 |
| 6,164,284 A | 12/2000 | Schulman et al. | 128/899 |
| 6,268,161 B1 | 7/2001 | Han et al. | 435/14 |
| 6,291,900 B1 * | 9/2001 | Tiemann et al. | 290/1 A |
| 6,409,674 B1 | 6/2002 | Brockway et al. | 600/486 |
| 6,432,050 B1 | 8/2002 | Porat et al. | 600/300 |
| 6,475,750 B1 | 11/2002 | Han et al. | 435/14 |
| 6,524,256 B2 | 2/2003 | Schaldach et al. | 600/486 |
| 6,564,807 B1 | 5/2003 | Schulman et al. | 128/899 |
| 6,580,177 B1 | 6/2003 | Hagood, IV et al. | 290/1 R |
| 6,589,184 B2 | 7/2003 | Norén et al. | 600/486 |
| 6,638,231 B2 | 10/2003 | Govari et al. | 600/486 |
| 6,682,490 B2 | 1/2004 | Roy et al. | 600/486 |
| 6,711,423 B2 | 3/2004 | Colvin, Jr. | 600/317 |
| 6,822,343 B2 | 11/2004 | Estevez | 290/1 R |
| 6,827,682 B2 | 12/2004 | Bugge et al. | 600/16 |
| 6,829,507 B1 | 12/2004 | Lidman et al. | 607/19 |
| 6,860,857 B2 | 3/2005 | Norén et al. | 600/486 |
| 6,895,265 B2 | 5/2005 | Silver | 600/345 |
| 6,953,469 B2 | 10/2005 | Ryan | 606/192 |
| 7,032,600 B2 | 4/2006 | Fukuda et al. | 128/899 |
| 7,033,322 B2 | 4/2006 | Silver | 600/486 |
| 7,081,683 B2 * | 7/2006 | Ariav | 290/1 R |
| 7,081,699 B2 | 7/2006 | Keolian et al. | 310/311 |
| 7,241,266 B2 | 7/2007 | Zhou et al. | 600/365 |
| 7,263,894 B2 | 9/2007 | Tenerz | 73/756 |
| 7,302,856 B2 | 12/2007 | Tang et al. | 73/777 |
| 7,362,557 B2 | 4/2008 | Soudier et al. | |
| 7,413,547 B1 | 8/2008 | Lichtscheidl et al. | 600/486 |
| 7,424,325 B2 | 9/2008 | Koller et al. | 607/35 |
| 7,427,265 B1 | 9/2008 | Keilman et al. | 600/300 |
| 7,452,334 B2 | 11/2008 | Gianchandani et al. | 600/486 |
| 7,616,990 B2 | 11/2009 | Chavan et al. | 607/2 |
| 7,616,992 B2 | 11/2009 | Dennis et al. | 607/9 |
| 7,715,918 B2 * | 5/2010 | Melvin | 607/35 |
| 7,729,767 B2 | 6/2010 | Baker, III et al. | 607/35 |
| 7,729,768 B2 | 6/2010 | White et al. | 607/35 |
| 7,777,623 B2 | 8/2010 | Albsmeier et al. | 340/539.26 |
| 7,798,973 B2 | 9/2010 | Stahmann | 600/485 |
| 7,859,171 B2 * | 12/2010 | Micallef | 310/339 |
| 2002/0028999 A1 | 3/2002 | Schaldach et al. | 600/486 |
| 2003/0158584 A1 | 8/2003 | Cates et al. | 607/2 |
| 2004/0021322 A1 * | 2/2004 | Ariav | 290/1 R |
| 2004/0039242 A1 * | 2/2004 | Tolkoff et al. | 600/9 |
| 2004/0078027 A1 | 4/2004 | Shachar | 604/891.1 |
| 2004/0158294 A1 * | 8/2004 | Thompson | 607/17 |
| 2004/0173220 A1 | 9/2004 | Harry et al. | 128/892 |
| 2004/0193058 A1 | 9/2004 | Montegrande et al. | 600/488 |
| 2004/0204744 A1 | 10/2004 | Penner et al. | 607/23 |
| 2004/0215279 A1 | 10/2004 | Houben et al. | 607/35 |
| 2005/0055061 A1 * | 3/2005 | Holzer | 607/35 |
| 2005/0080346 A1 | 4/2005 | Gianchandani et al. | 600/486 |
| 2005/0256549 A1 | 11/2005 | Holzer | 607/35 |
| 2005/0261563 A1 | 11/2005 | Zhou et al. | 600/347 |
| 2006/0044078 A1 * | 3/2006 | Ayazi et al. | 333/186 |
| 2006/0152309 A1 | 7/2006 | Mintchev et al. | 335/58 |
| 2006/0184206 A1 * | 8/2006 | Baker et al. | 607/35 |
| 2006/0217776 A1 * | 9/2006 | White et al. | 607/35 |
| 2006/0224214 A1 * | 10/2006 | Koller et al. | 607/62 |
| 2007/0074731 A1 * | 4/2007 | Potter | 128/899 |
| 2007/0088402 A1 * | 4/2007 | Melvin | 607/35 |
| 2007/0093875 A1 | 4/2007 | Chavan et al. | 607/46 |
| 2007/0142728 A1 | 6/2007 | Penner et al. | 600/486 |
| 2007/0149885 A1 | 6/2007 | Corl et al. | 600/505 |
| 2007/0167988 A1 | 7/2007 | Cernasov | 607/35 |
| 2007/0221233 A1 | 9/2007 | Kawano et al. | 128/899 |
| 2007/0293904 A1 * | 12/2007 | Gelbart et al. | 607/35 |
| 2008/0009687 A1 | 1/2008 | Smith et al. | 600/302 |
| 2008/0021333 A1 | 1/2008 | Huelskamp | 600/486 |
| 2008/0082005 A1 | 4/2008 | Stern et al. | 600/486 |
| 2008/0132967 A1 | 6/2008 | Von Arx et al. | 607/18 |
| 2008/0172043 A1 | 7/2008 | Sheppard et al. | 604/891.1 |
| 2008/0212262 A1 * | 9/2008 | Micallef | 361/502 |
| 2008/0262562 A1 * | 10/2008 | Roberts et al. | 607/35 |
| 2008/0281298 A1 | 11/2008 | Andersen et al. | 604/891.1 |
| 2009/0171413 A1 | 7/2009 | Zenati et al. | 607/32 |
| 2009/0171448 A1 | 7/2009 | Eli | 623/1.32 |
| 2009/0270742 A1 | 10/2009 | Wolinsky et al. | 600/486 |
| 2009/0281399 A1 | 11/2009 | Keel et al. | 600/301 |
| 2009/0292335 A1 * | 11/2009 | Leonov | 607/35 |
| 2010/0010600 A1 | 1/2010 | Eriksson et al. | 604/116 |
| 2010/0030043 A1 | 2/2010 | Kuhn | 600/339 |
| 2010/0036450 A1 | 2/2010 | Axelrod et al. | 607/35 |
| 2010/0049275 A1 | 2/2010 | Chavan et al. | 607/44 |
| 2010/0076517 A1 * | 3/2010 | Imran | 607/35 |
| 2010/0140943 A1 | 6/2010 | Hyde et al. | 290/50 |
| 2010/0140956 A1 | 6/2010 | Hyde et al. | 290/1 R |
| 2010/0140957 A1 | 6/2010 | Hyde et al. | 290/1 R |
| 2010/0140958 A1 | 6/2010 | Hyde et al. | 290/1 R |
| 2010/0140959 A1 | 6/2010 | Hyde et al. | 290/1 R |
| 2010/0141052 A1 | 6/2010 | Hyde et al. | 307/151 |
| 2010/0228312 A1 * | 9/2010 | White et al. | 607/35 |
| 2010/0298720 A1 * | 11/2010 | Potkay | 600/485 |
| 2011/0062713 A1 | 3/2011 | Ardoise et al. | 290/53 |
| 2011/0094314 A1 | 4/2011 | Dekker et al. | 73/862.045 |
| 2011/0275947 A1 | 11/2011 | Feldman et al. | 600/508 |

OTHER PUBLICATIONS

Zhong Lin Wang, Self-Powered Nanotech: Nanosize Machines Need Still Tinier Power Plants, Scientific American Magazine, Dec. 16, 2007, pp. 82-87, Published in: US.

Kara Gavin, Zapping the Heart Back Into Rhythm, University of Michigan Health Minute, Jun. 2, 2005, Published in: Ann Arbor, MI.

Dmitriev, V.F., et al., "Tunable High-Q Surface-Acoustic-Wave Resonator"; Technical Physics, vol. 52, No. 8, Aug. 2007, pp. 1061-1067.

Lucklum, Frieder, et al., "Acoustic Wave Generation and Detection in Non-Piezoelectric High-Q Resonators", Ultrasonics Symposium, 2006, Oct. 2006, pp. 1132-1135.

* cited by examiner

METHOD FOR GENERATION OF POWER FROM INTRALUMINAL PRESSURE CHANGES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/315,631, titled Method for Generation of Power from Intraluminal Pressure Changes, naming Roderick A. Hyde, Muriel Y. Ishikawa, Eric C. Leuthardt, Michael A. Smith, Lowell L. Wood, Jr. and Victoria Y. H. Wood as inventors, filed Dec. 4, 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

Small scale generators for generating energy at levels suitable for powering devices which are in vivo or ex vivo to a human or animal are described. Such generators may be implanted in luminal structures so as to extract power from intraluminal pressure changes.

DETAILED DESCRIPTION

Figure 1:
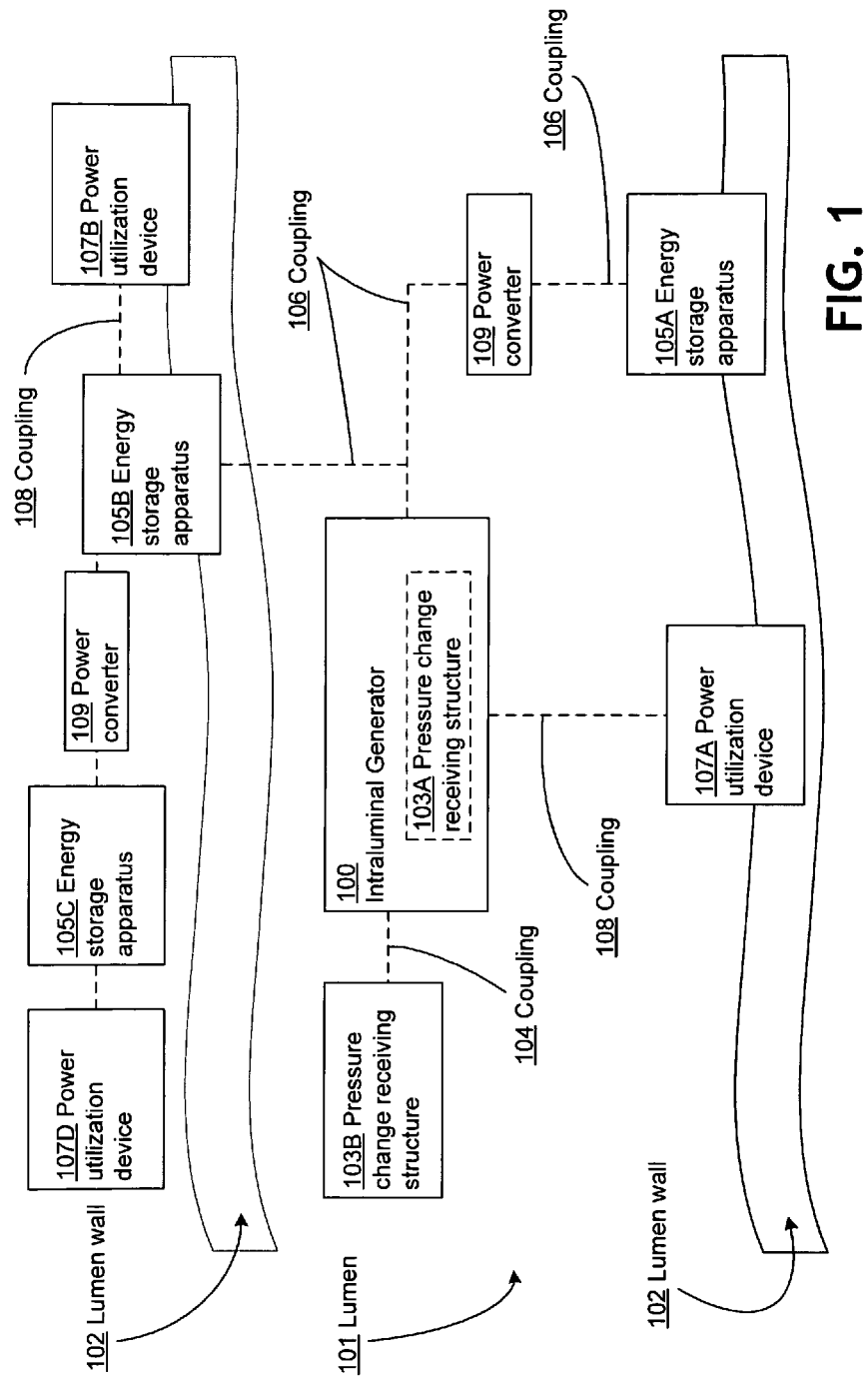
FIG. 1 shows a high-level block diagram of an intraluminal power generation system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 2:
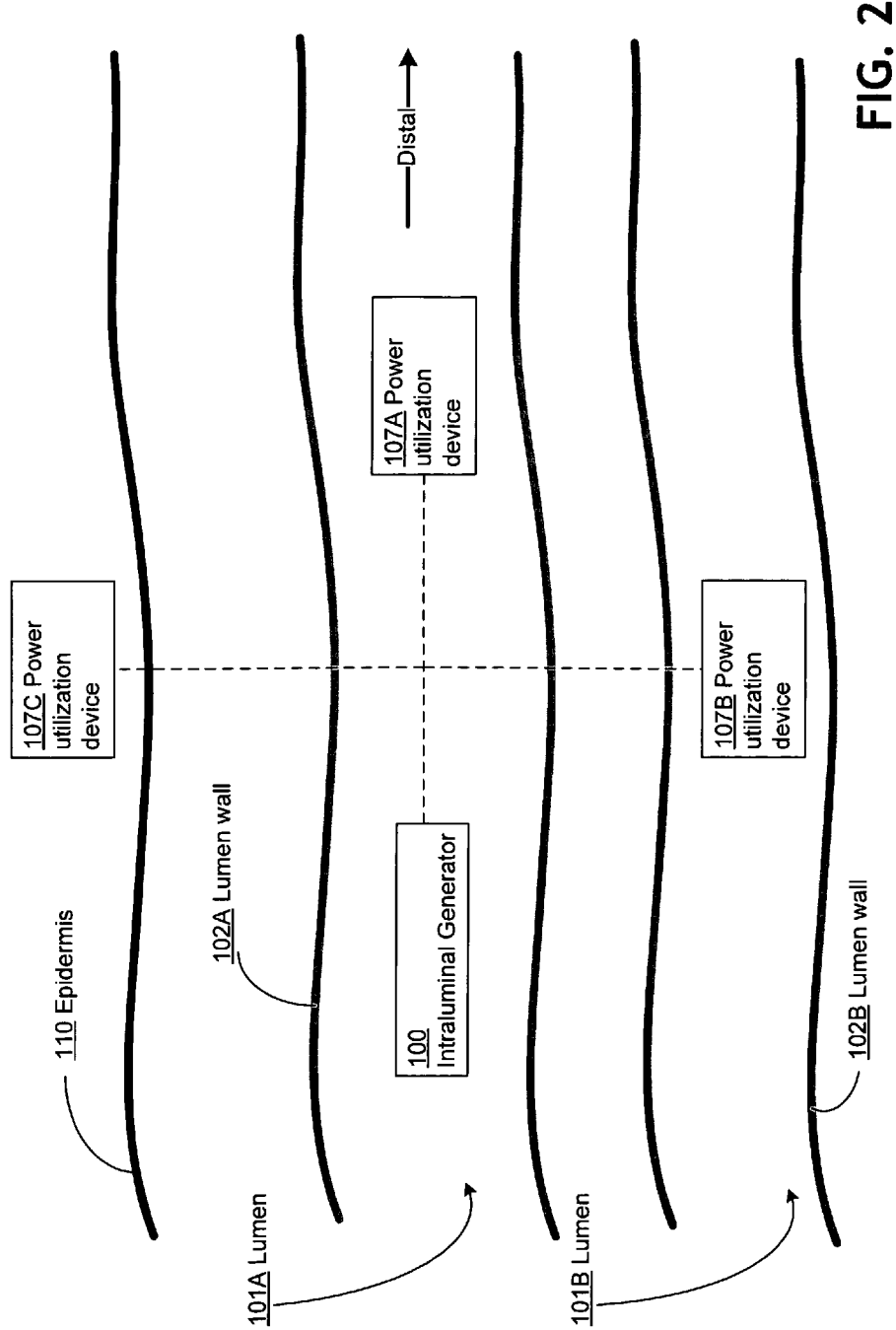
FIG. 2 shows a high-level block diagram of an intraluminal power generation system.

FIGS. 1 and 2 illustrate example environments in which one or more technologies may be implemented. An intraluminal power generation system may comprise intraluminal generator 100 configured for disposal within an anatomical lumen 101 defined by a lumen wall 102. The generator may be configured to convert a varying intraluminal pressure into energy (e.g. electrical energy, mechanical/elastic energy, chemical energy, thermal energy).

The intraluminal generator 100 may include an integrated pressure change receiving structure 103A configured to receive a pressure change associated with a fluid pressure within the lumen 101. Alternately, a pressure change receiving structure 103B may be operably coupled to the intraluminal generator 100 via a coupling 104 to transfer a received pressure from the pressure change receiving structure 103B to the intraluminal generator 100 in a form which the intraluminal generator 100 may convert to energy.

The intraluminal power generation system may comprise an energy storage apparatus 105 for storage of energy generated by the intraluminal generator 100. The energy storage apparatus 105 may be operably coupled to the intraluminal generator 100 by a coupling 106.

The intraluminal power generation system may comprise a power utilization device 107 which may use energy generated by the intraluminal generator 100 or stored in the energy storage apparatus 105 to carry out a desired function. The power utilization device 107 may be operably coupled to the intraluminal generator 100 or an energy storage apparatus 105 by a coupling 108.

FIG. 2 illustrates various spatial configurations of one or more components of an intraluminal power generation system. An intraluminal generator 100 disposed within in a first lumen 101A may be operably coupled to power utilization device 107A disposed in the first lumen 101A (e.g. in a distal relationship to the power utilization device 107A). An intraluminal generator 100 disposed within in a first lumen 101A may be operably coupled to power utilization device 107B disposed in a second lumen 101B. An intraluminal generator 100 disposed within in a first lumen 101A may be operably coupled to an ex vivo power utilization device 107C disposed outside an epidermis layer.

Figure 3:
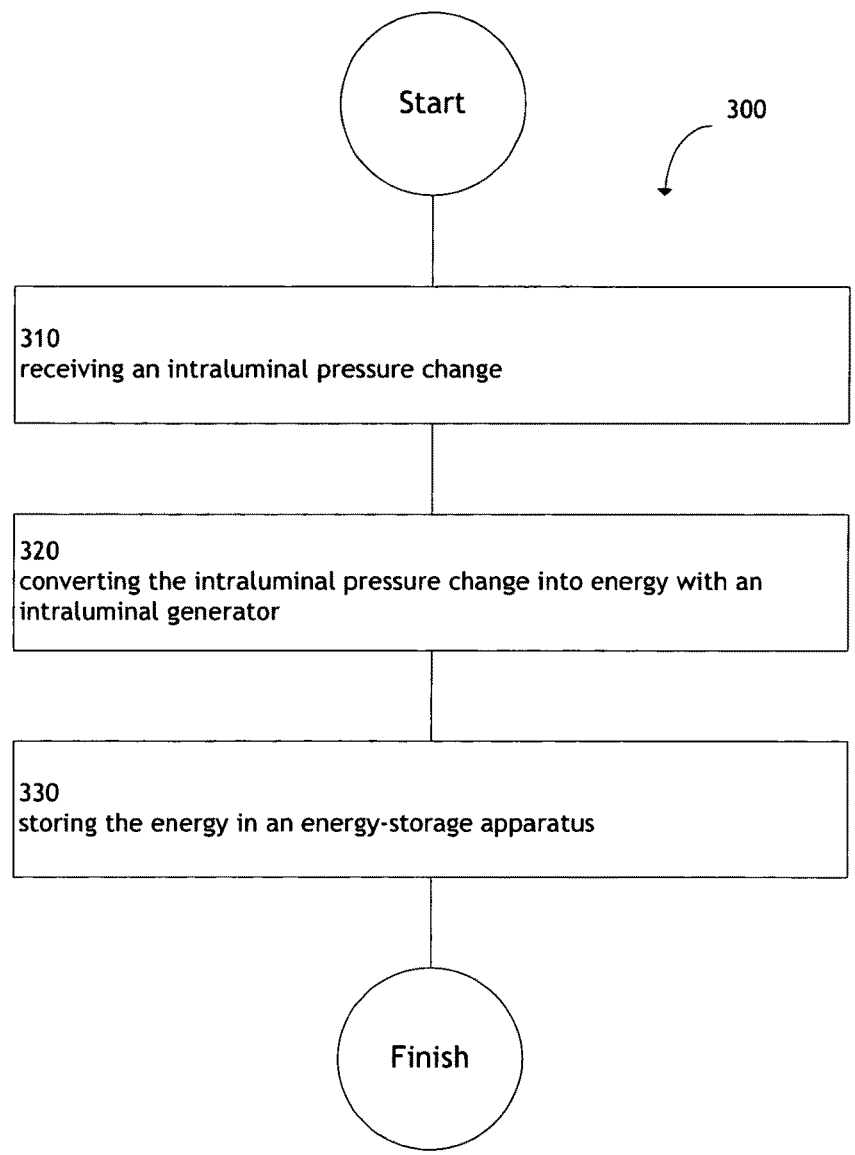
FIG. 3 is a high-level logic flowchart of a process.

FIG. 3 illustrates an operational flow 300 representing example operations related to generating power from changes in intraluminal pressure. In FIG. 3 and in following figures that include various examples of operational flows, discussion and explanation may be provided with respect to the above-described examples of FIGS. 1 and 2, and/or with respect to other examples and contexts. However, it should be understood that the operational flows may be executed in a number of other environments and contexts, and/or in modified versions of FIGS. 1 and 2. Also, although the various operational flows are presented in the sequence(s) illustrated, it should be understood that the various operations may be performed in other orders than those which are illustrated, or may be performed concurrently.

After a start operation, the operational flow 300 moves to an operation 310. Operation 310 depicts receiving an intraluminal pressure change. For example, as shown in FIG. 1, a change in pressure within the lumen 101 may be received by a pressure change receiving structure 103. The pressure change receiving structure 103 may receive a change in pressure through exposure of a surface of the pressure change receiving structure 103 to the luminal environment such that a change in the intraluminal pressure may exert a force on the pressure change receiving structure 103 thereby resulting in a deformation of the pressure change receiving structure 103.

Operation 320 depicts converting the intraluminal pressure change into energy with an intraluminal generator. For example, as shown in FIG. 1, the change in pressure may induce a movement and/or deformation of the pressure change receiving structure 103 which may be translated either directly (e.g. the intraluminal generator 100 comprises the pressure change receiving structure 103A) or indirectly (e.g. the pressure change receiving structure 103B is operably coupled to a generator) into energy either through the motion of the pressure change receiving structure 103 and/or the electrical properties of the materials comprising the pressure change receiving structure 103.

Operation 330 depicts storing the energy in an energy storage apparatus. For example, as shown in FIG. 1, energy generated by the intraluminal generator 100 in response to the movement and/or deformation of the pressure change receiving structure 103 may be stored in an energy storage apparatus 105.

Figure 4:
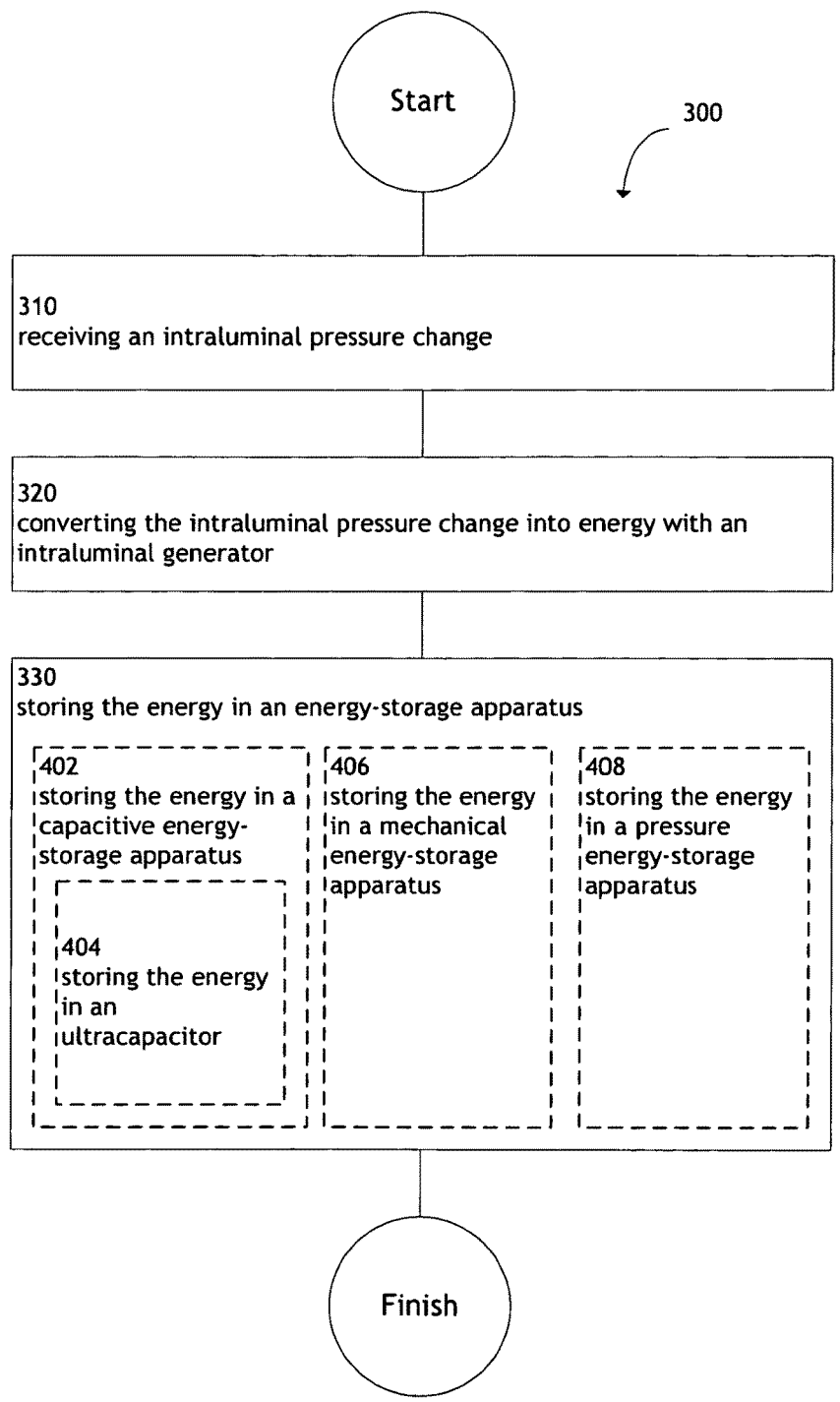
FIG. 4 is a high-level logic flowchart of a process.

FIG. 4 illustrates alternative embodiments of the example operational flow 300 of FIG. 3. FIG. 4 illustrates example embodiments where the storing operation 330 may include at least one additional operation. Additional operations may include an operation 402, an operation 404, an operation 406 and/or an operation 408.

Operation 402 depicts storing the energy in a capacitive energy storage apparatus. For example, as shown in FIG. 1, energy generated by the intraluminal generator 100 in response to the movement and/or deformation of the pressure change receiving structure 103 may be stored in a capacitive energy storage apparatus 105. A capacitive energy storage apparatus 105 may comprise two conducting electrodes separated by a dielectric. The capacitive energy storage apparatus 105 may be electrolytic or electrostatic.

Operation 404 depicts storing the energy in an ultracapacitor. For example, as shown in FIG. 1, energy generated by the intraluminal generator 100 in response to the movement and/or deformation of the pressure change receiving structure 103 may be stored in a ultracapacitive energy storage apparatus 105. An ultracapacitive energy storage apparatus 105 may be a electric double-layer capacitor comprising two or more dielectric layers. The dielectric layers may comprise activated carbon, carbon nanotubes, activated polypyrrole, barium titanate, and the like.

Operation 406 depicts storing the energy in a mechanical energy storage apparatus. For example, as shown in FIG. 1, energy generated by the intraluminal generator 100 in response to the movement and/or deformation of the pressure change receiving structure 103 may be stored in a mechanical energy storage apparatus 105. The intraluminal generator 100 may include a mechanical linkage (e.g. a lever mechanism) operably coupled to a mechanical energy storage apparatus 105 whereby movement of the mechanical linkage in response to the movement and/or deformation of the pressure change receiving structure 103 may cause the mechanical energy storage apparatus 105 to store a mechanical energy (e.g. as a spring force, kinetic energy, and the like). The mechanical energy storage apparatus 105 may include a spring and ratchet, a flywheel, and the like.

Operation 408 depicts storing the energy in a pressure energy storage apparatus. For example, as shown in FIG. 1, energy generated by the intraluminal generator 100 in response to the movement and/or deformation of the pressure change receiving structure 103 may be stored in a pressure energy storage apparatus 105. The intraluminal generator 100 may include a pump mechanism operably coupled to a pressure energy storage apparatus 105 whereby movement and/or deformation of the pressure change receiving structure 103 may cause the pressure energy storage apparatus 105 to store pressure energy. The mechanical energy storage apparatus 105 may include a rigid, semi-rigid or elastic pressure vessel.

Figure 5:
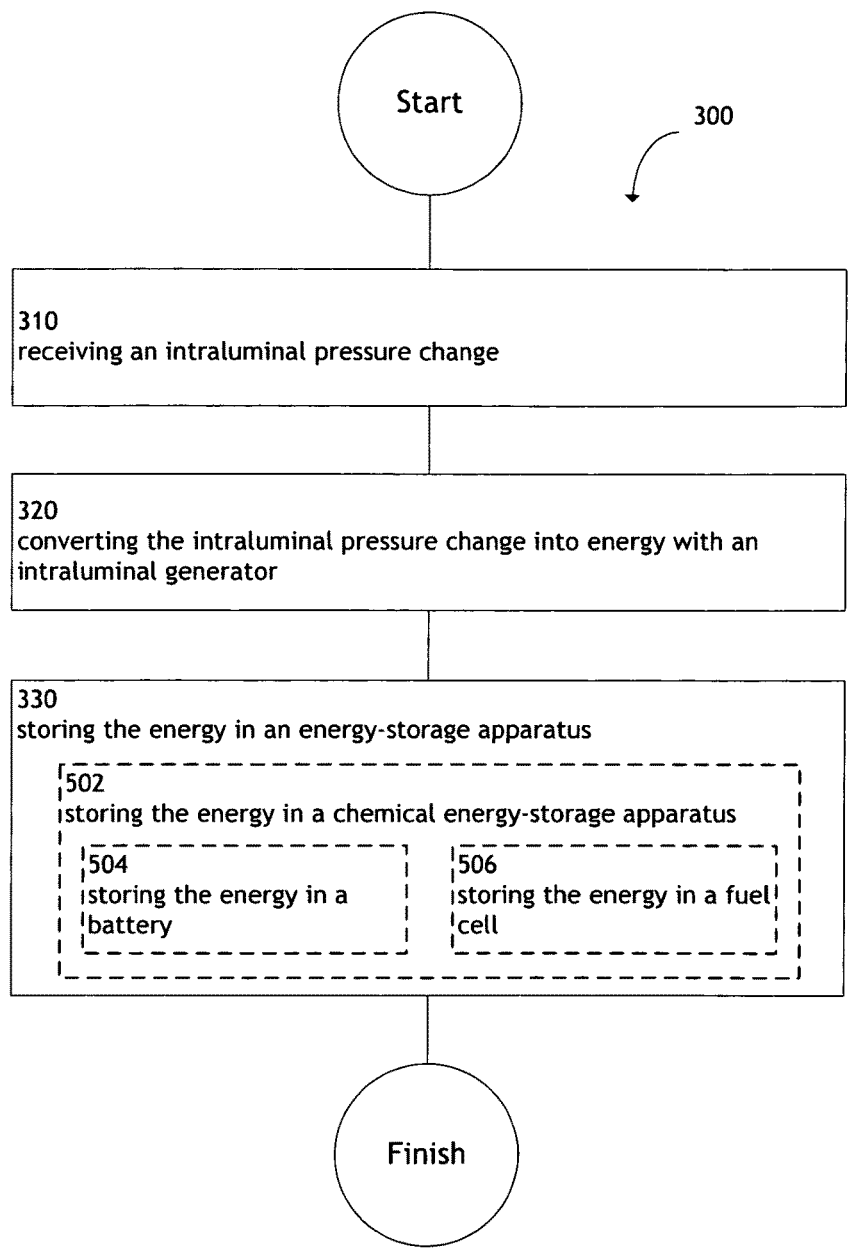
FIG. 5 is a high-level logic flowchart of a process.

FIG. 5 illustrates alternative embodiments of the example operational flow 300 of FIG. 3. FIG. 5 illustrates example embodiments where the storing operation 330 may include at least one additional operation. Additional operations may include an operation 502, an operation 504, and/or an operation 506.

Operation 502 depicts storing the energy in a chemical energy storage apparatus. For example, as shown in FIG. 1, energy generated by the intraluminal generator 100 in response to the movement and/or deformation of the pressure change receiving structure 103 may be stored in a chemical energy storage apparatus 105. The chemical energy storage apparatus 105 may include one or more electrochemical cells such as of a galvanic cell, an electrolytic cell, a fuel cell, a flow cell, a voltaic pile and the like.

Operation 504 depicts storing the energy in a battery. For example, as shown in FIG. 1, the chemical energy storage apparatus 105 may comprise a battery. The battery may comprise one or more voltaic cells. The battery may be a rechargeable battery such as a nickel cadmium (NiCd), nickel metal hydride (NiMH), lithium ion (Li-ion), and lithium ion polymer (Li-ion polymer).

Operation 506 depicts storing the energy in a fuel cell. For example, as shown in FIG. 1, the chemical energy storage apparatus 105 may comprise a fuel cell. The fuel cell may be selected from one or more of a metal hydride fuel cell, an electro-galvanic fuel cell, a direct formic acid fuel cell (DFAFC), a zinc-air fuel cell, a microbial fuel cell, an upflow microbial fuel cell (UMFC), a direct borohydride fuel cell, an alkaline fuel cell, a direct methanol fuel cell, a reformed methanol fuel cell, a direct formic acid fuel cell, proton exchange membrane fuel cell, an RFC—Redox fuel cell, a protonic ceramic fuel cell, a direct carbon fuel cell, a planar solid oxide fuel cell, and the like. The fuel cell may be a reversible fuel cell combined with an electrolyzer and a fuel storage apparatus to utilize an electrical current generated by the intraluminal generator 100 to generate fuel cell fuel components (e.g. oxygen and hydrogen) from a fuel cell product (e.g. water). The fuel cell fuel components may be stored in the fuel cell storage apparatus for later use in recovering energy from the fuel cell fuel components via the fuel cell.

Figure 6:
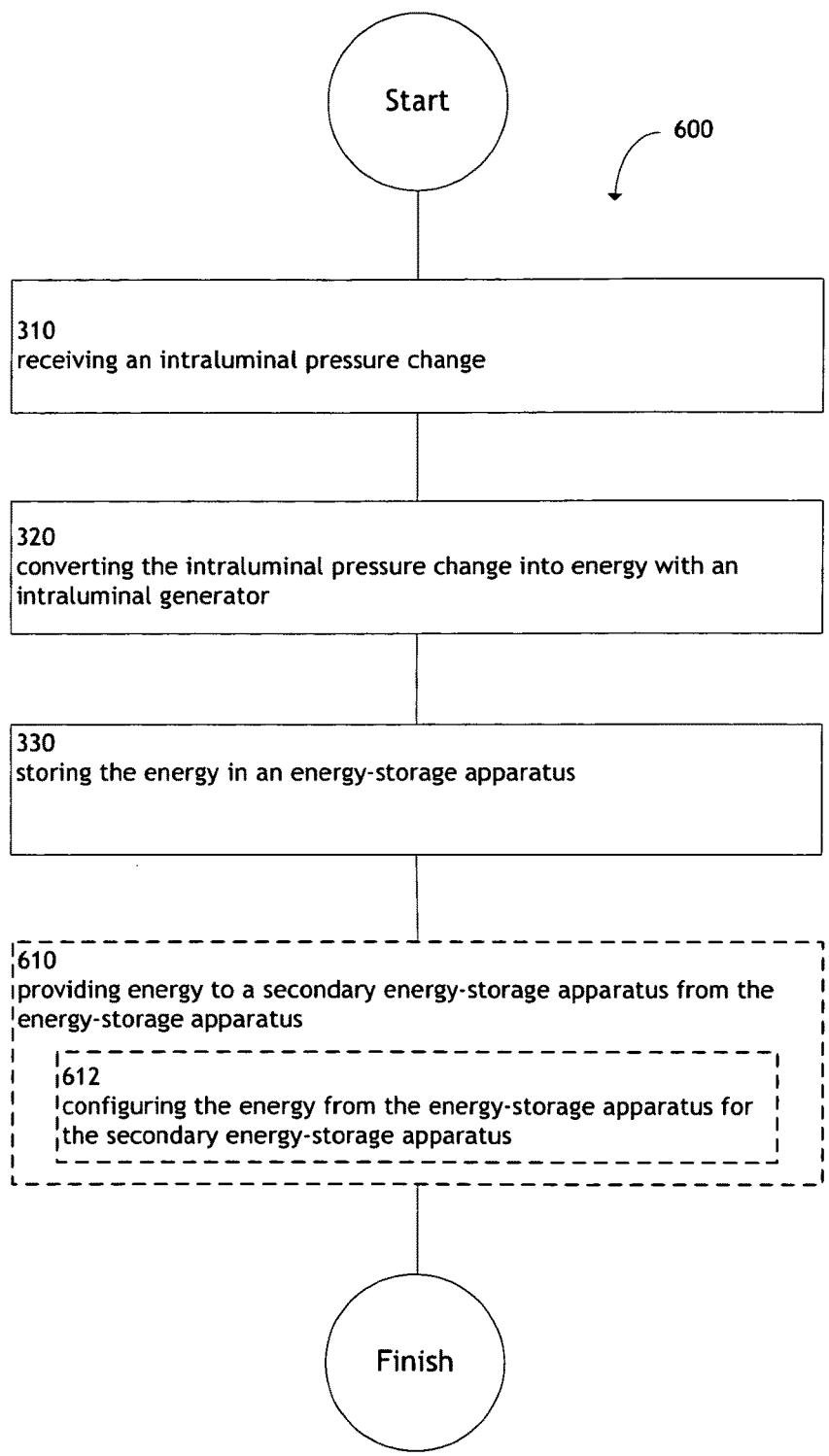
FIG. 6 is a high-level logic flowchart of a process.

FIG. 6 illustrates an operational flow 600 representing example operations related to generating-power from changes in intraluminal pressure. FIG. 6 illustrates example embodiments where operational flow 300 may include at least one additional operation. Additional operations may include an operation 610, and/or an operation 612.

Operation 610 depicts providing energy to a secondary energy storage apparatus from the energy storage apparatus. For example, as shown in FIG. 1, energy stored in the energy storage apparatus 105B may be transmitted to a secondary energy storage apparatus 105C.

Operation 612 depicts configuring the energy from the energy-storage apparatus for the secondary energy-storage. For example, as shown in FIG. 1, energy stored in energy storage apparatus 105B may be configured by a converter 109 prior to storage in a secondary energy storage apparatus 105C. The energy stored in the energy storage apparatus 105B may be unsuitable for use by a particular power utilization device 107D. As such, the energy stored in the energy storage apparatus 105B may be configured (e.g. voltage regulation, current regulation, inversion, rectification, phase modification, translation into another form of energy (e.g. converting electrical energy to mechanical energy) and the like) and stored in secondary energy storage apparatus 105C for use by power utilization device 107D.

Figure 7:
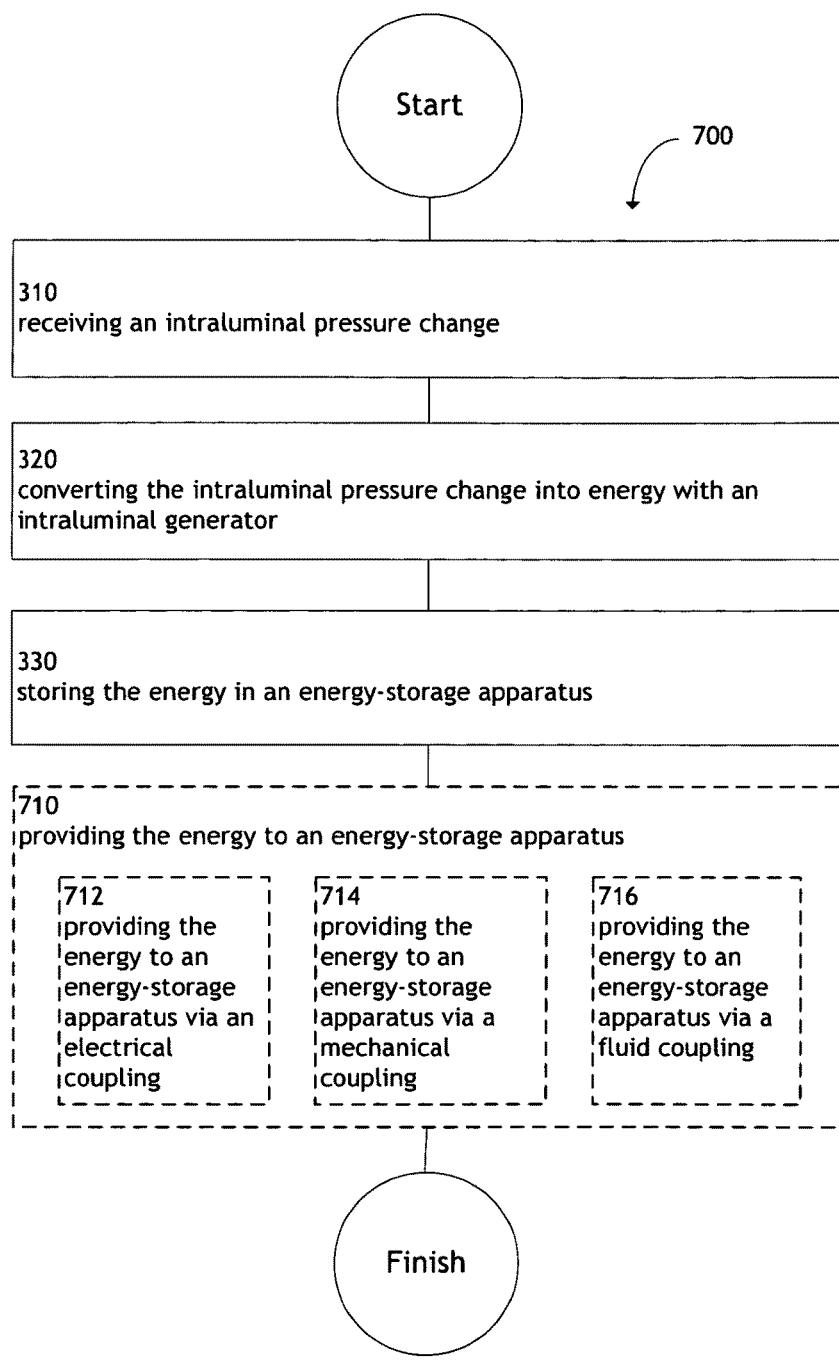
FIG. 7 is a high-level logic flowchart of a process.

FIG. 7 illustrates an operational flow 700 representing example operations related to generating power from changes in intraluminal pressure. FIG. 6 illustrates example embodiments where operational flow 300 may include at least one additional operation. Additional operations may include an operation 710, an operation 712, an operation 714, and/or an operation 716.

Operation 710 depicts providing the energy to an energy storage apparatus. For example, as shown in FIG. 1, energy generated by the intraluminal generator 100 in response to the movement and/or deformation of the pressure change receiving structure 103 may be transmitted to an energy storage apparatus 105 operably coupled to the intraluminal generator 100 by a coupling 106.

Operation 712 depicts providing the energy to an energy storage apparatus via an electrical coupling. For example, as shown in FIG. 1, energy generated by the intraluminal generator 100 in response to the movement and/or deformation of the pressure change receiving structure 103 may be transmitted to an energy storage apparatus 105 operably coupled to the intraluminal generator 100 by an electrical coupling 106 (e.g. one or more wires).

Operation 714 depicts providing the energy to an energy storage apparatus via a mechanical coupling. For example, as shown in FIG. 1, energy generated by the intraluminal generator 100 in response to the movement and/or deformation of the pressure change receiving structure 103 may be transmitted to an energy storage apparatus 105 operably coupled to the intraluminal generator 100 by an mechanical coupling 106 (e.g. one or more torque shaft, levers, piston, crankshaft and the like).

Operation 716 depicts providing the energy to an energy storage apparatus via a fluid coupling. For example, as shown in FIG. 1, energy generated by the intraluminal generator 100 in response to the movement and/or deformation of the pressure change receiving structure 103 may be transmitted to an energy storage apparatus 105 operably coupled to the intraluminal generator 100 by an fluid coupling 106 (e.g. a hydraulic line, pipe, hose, and the like). One or more of the intraluminal generator 100 and the energy storage apparatus 105 may comprise a pump whereby energy may be transmitted via fluid flow between the intraluminal generator 100 and the energy storage apparatus 105.

Figure 8:
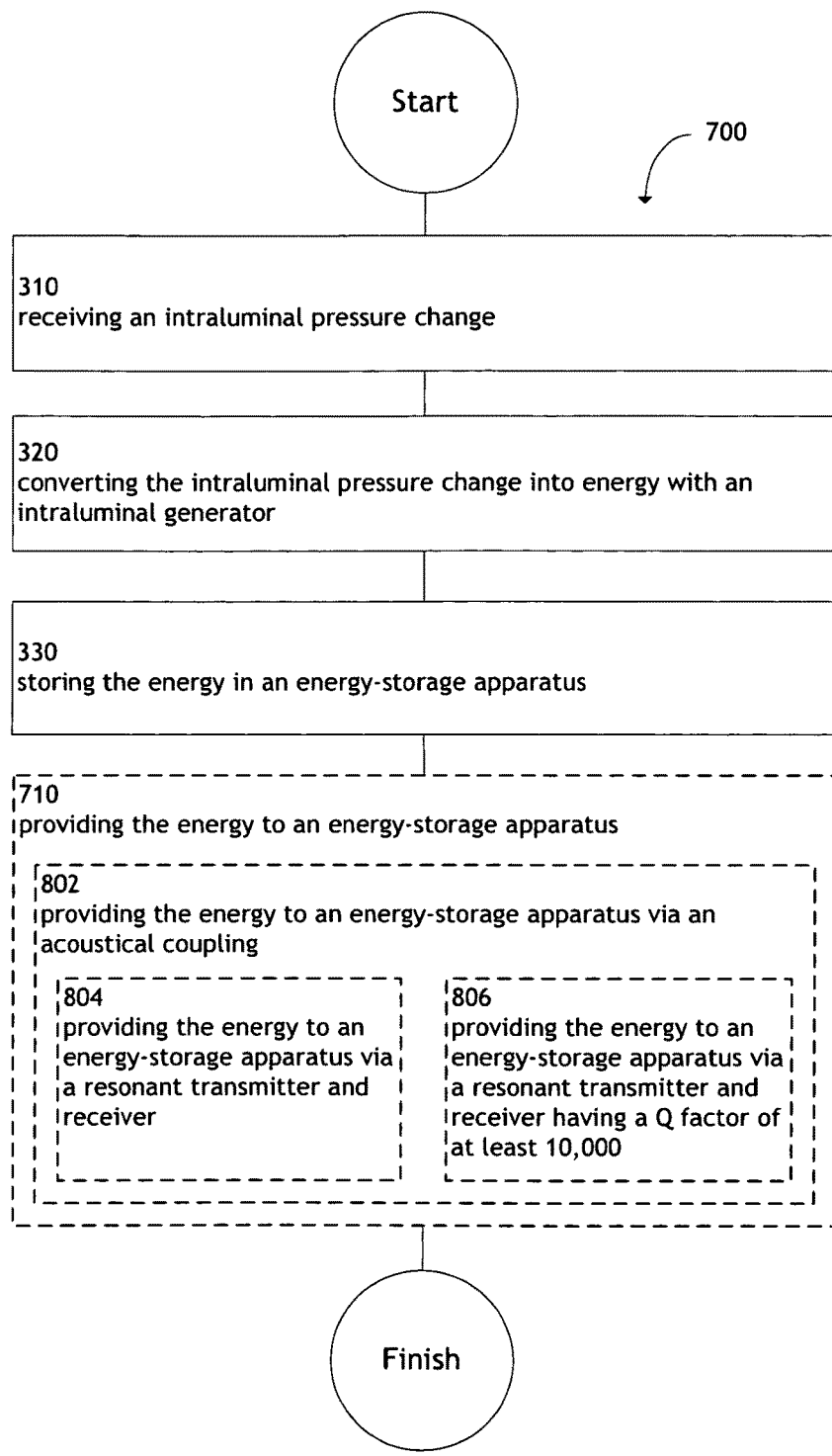
FIG. 8 is a high-level logic flowchart of a process.

FIG. 8 illustrates alternative embodiments of the example operational flow 700 of FIG. 7. FIG. 8 illustrates example embodiments where the providing operation 710 may include at least one additional operation. Additional operations may include an operation 802, an operation 804, and/or an operation 806.

Operation 802 depicts providing the energy to an energy storage apparatus via an acoustical coupling. For example, as shown in FIG. 1, energy generated by the intraluminal generator 100 in response to the movement and/or deformation of the pressure change receiving structure 103 may be transmitted to an energy storage apparatus 105 operably coupled to the intraluminal generator 100 by an acoustical coupling 106. One or more of the intraluminal generator 100 and the energy storage apparatus 105 may comprise one or more of an acoustical transmitter (e.g. an acoustic transducer and the like) and an acoustical receiver (e.g. a hydrophone) whereby energy may be conveyed via acoustical signals transceived between the intraluminal generator 100 and the energy storage apparatus 105.

Operation 804 depicts providing the energy to at least one energy storage apparatus via a resonant transmitter and receiver. For example, as shown in FIG. 1, and described above with respect to operation 802, one or more of the intraluminal generator 100 and the energy storage apparatus 105 may comprise one or more of an acoustical transmitter (e.g. an acoustic transducer and the like) and an acoustical receiver (e.g. a hydrophone) whereby energy may be conveyed via acoustical signals transceived between the intraluminal generator 100 and the energy storage apparatus 105. The one or more acoustical transmitters and acoustical receivers may be in resonance (e.g. an acoustical transmitter generates acoustical waves that are in phase with a movement of the acoustical receiver).

Operation 806 depicts providing the energy to at least one energy storage apparatus via a resonant transmitter and receiver having a Q factor of at least 10,000. For example, as shown in FIG. 1, and described above with respect to operations 802 and 804, one or more of the intraluminal generator 100 and the energy storage apparatus 105 may comprise one or more of an acoustical transmitter (e.g. an acoustic transducer and the like) and an acoustical receiver (e.g. a hydrophone) whereby energy may be conveyed via acoustical signals transceived between the intraluminal generator 100 and the energy storage apparatus 105. The one or more acoustical transmitters and acoustical receivers may be in resonance (e.g. an acoustical transmitter generates acoustical waves that are in phase with a movement of the acoustical receiver) where the Q factor of the acoustical transmitter and acoustical receiver is at least 10,000. A transmitter/receiver system may be such as described in "Tunable high-Q surface-acoustic-wave resonator" by Dmitriev, et al., *Technical Physics*, Volume 52, Number 8, August 2007, pp. 1061-1067(7); U.S. Patent Application Publication No. 20060044078, "Capacitive Vertical Silicon Bulk Acoustic Resonator" to Ayazi, et al.; "Acoustic Wave Generation and Detection in Non-Piezoelectric High-Q Resonators", Lucklum, et al., *Ultrasonics Symposium,* 2006, October 2006, Pages: 1132-1135.

Figure 9:
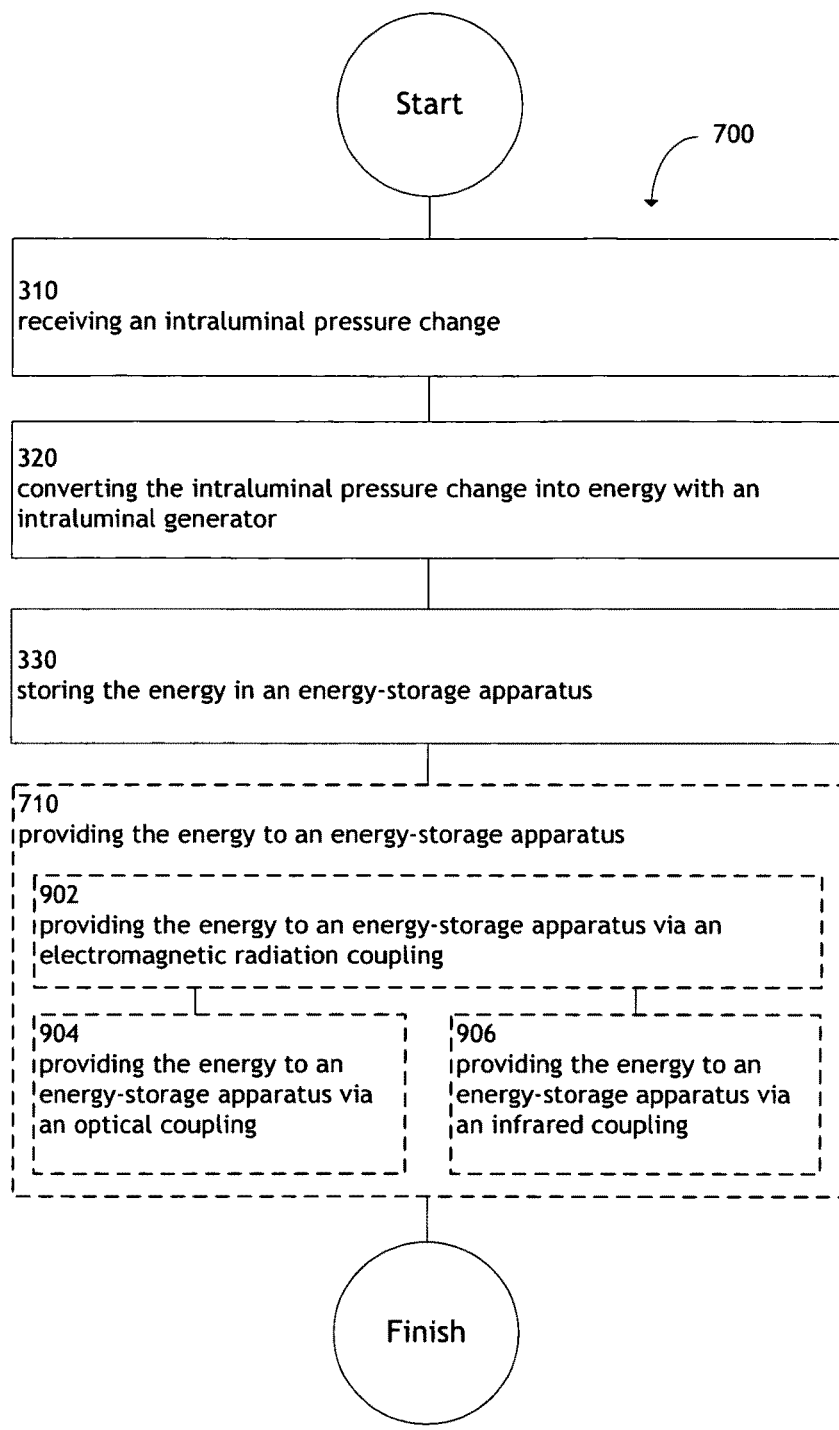
FIG. 9 is a high-level logic flowchart of a process.

FIG. 9 illustrates alternative embodiments of the example operational flow 700 of FIG. 7. FIG. 9 illustrates example embodiments where the providing operation 710 may include at least one additional operation. Additional operations may include an operation 902, an operation 904, and/or an operation 906.

Operation 902 depicts providing the energy to an energy storage apparatus via an electromagnetic radiation coupling. For example, as shown in FIG. 1, energy generated by the intraluminal generator 100 in response to the movement and/or deformation of the pressure change receiving structure 103 may be transmitted to an energy storage apparatus 105 operably coupled to the intraluminal generator 100 by an electromagnetic radiation (EMR) coupling 106. One or more of the intraluminal generator 100 and the energy storage apparatus 105 may comprise one or more of an EMR transmitter and an EMR receiver whereby energy may be transmitted via EMR signals transceived between the intraluminal generator 100 and the energy storage apparatus 105.

Operation 904 depicts providing the energy to an energy storage apparatus via an optical coupling. For example, as shown in FIG. 1, energy generated by the intraluminal generator 100 in response to the movement and/or deformation of the pressure change receiving structure 103 may be transmitted to an energy storage apparatus 105 operably coupled to the intraluminal generator 100 by an optical coupling 106. One or more of the intraluminal generator 100 and the energy storage apparatus 105 may comprise one or more of an optical transmitter (e.g. a light-emitting diode, a laser diode and the like) and an optical receiver (e.g. a photo diode, a photo detector and the like) whereby energy may be transmitted via optical signals transceived between the intraluminal generator 100 and the energy storage apparatus 105.

Operation 906 depicts providing the energy to an energy storage apparatus via an infrared coupling. For example, as shown in FIG. 1, energy generated by the intraluminal generator 100 in response to the movement and/or deformation of the pressure change receiving structure 103 may be transmitted to an energy storage apparatus 105 operably coupled to the intraluminal generator 100 by an infrared coupling 106. One or more of the intraluminal generator 100 and the energy storage apparatus 105 may comprise one or more of an infrared transmitter (e.g. a light-emitting diode, a laser diode and the like) and an optical receiver (e.g. a photo diode, a photo detector and the like) whereby energy may be transmitted via infrared signals transceived between the intraluminal generator 100 and the energy storage apparatus 105.

Figure 10:
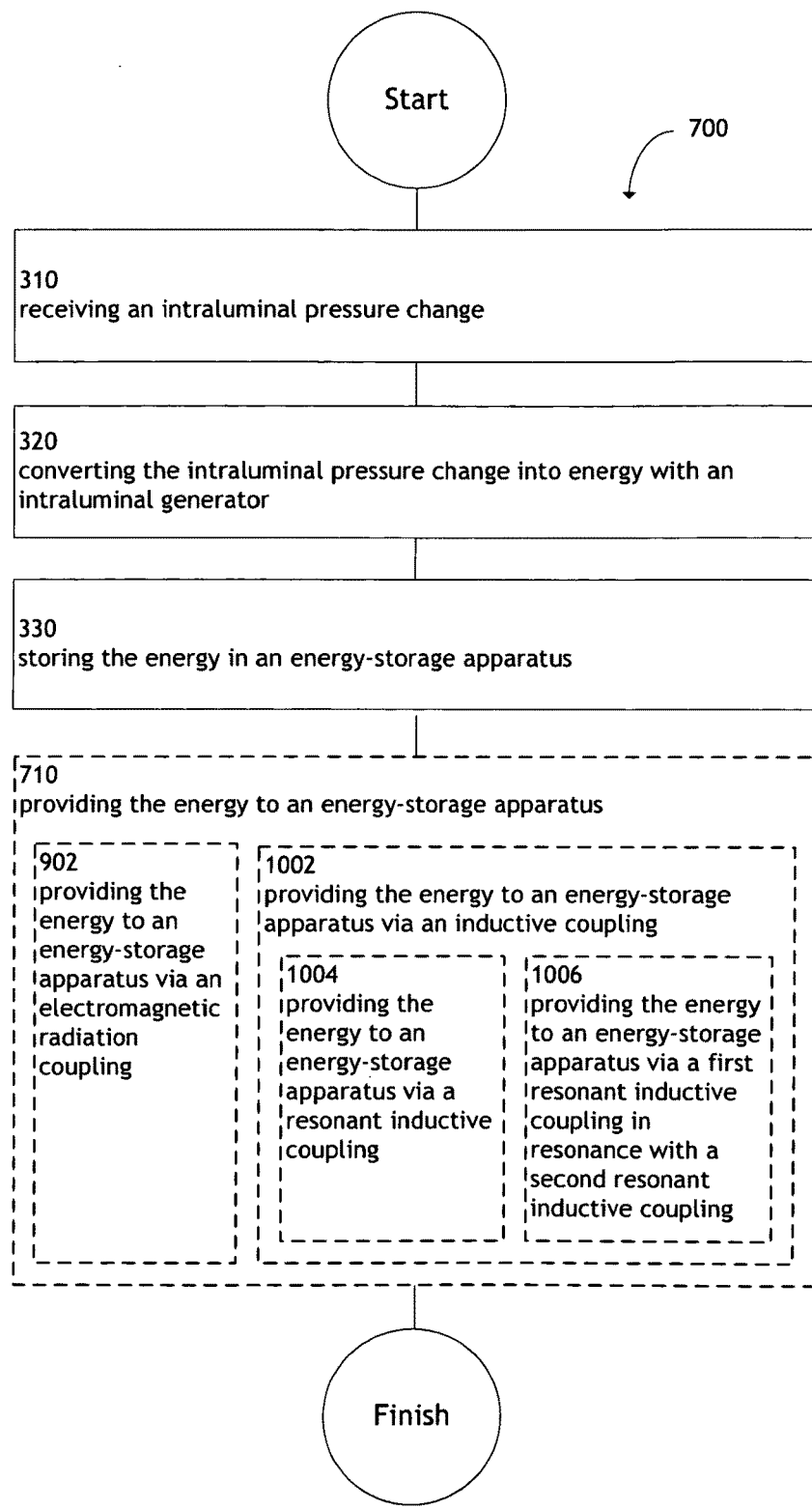
FIG. 10 is a high-level logic flowchart of a process.
Figure 11:
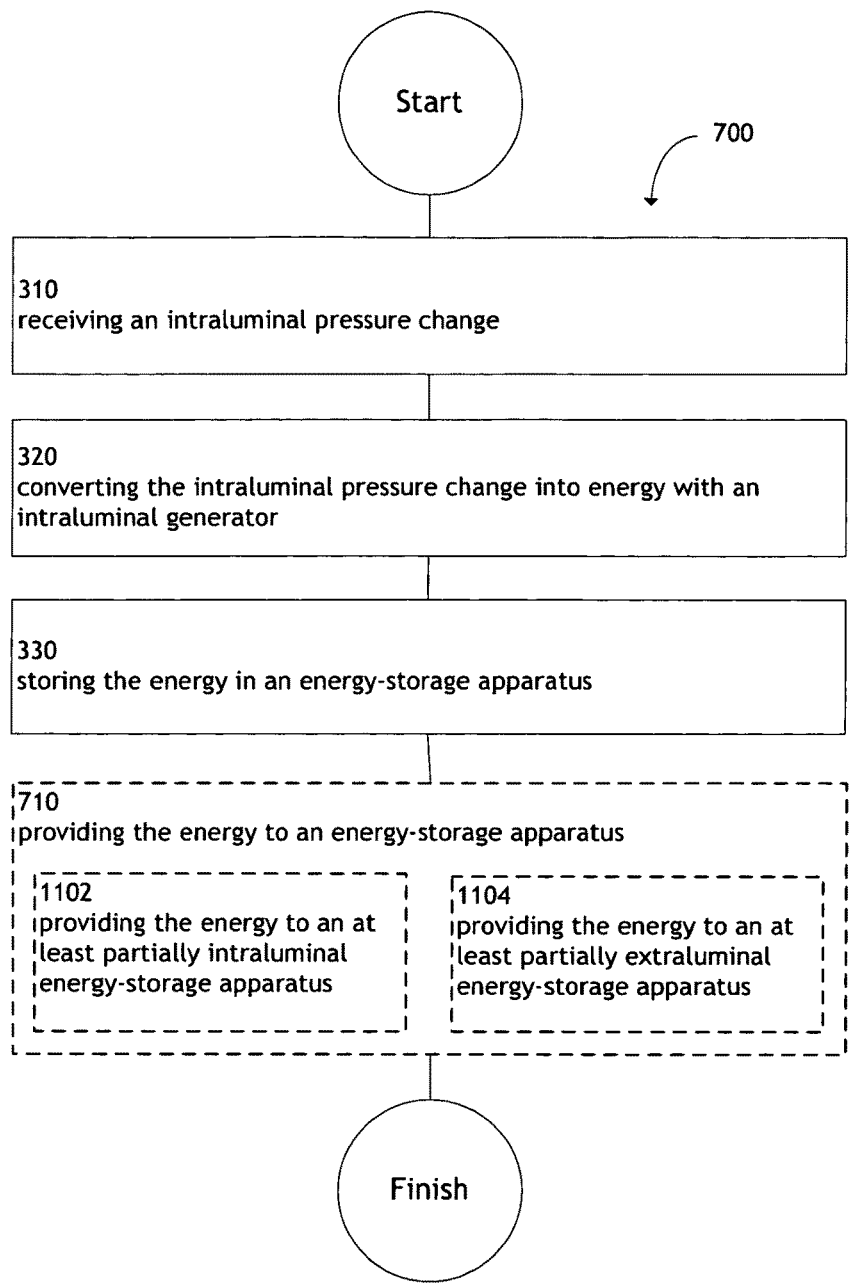
FIG. 11 is a high-level logic flowchart of a process.

FIG. 10 illustrates alternative embodiments of the example operational flow 700 of FIG. 7. FIG. 10 illustrates example embodiments where the providing operation 710 may include at least one additional operation. Additional operations may include an operation 1002, an operation 1004, and/or an operation 1006.

Operation 1002 depicts providing the energy to an energy storage apparatus via an inductive coupling. For example, as shown in FIG. 1, energy generated by the intraluminal generator 100 in response to the movement and/or deformation of the pressure change receiving structure 103 may be transmitted to an energy storage apparatus 105 operably coupled to the intraluminal generator 100 by an inductive coupling 106. The intraluminal generator 100 may include circuitry (e.g. a solenoid) configured to generate a magnetic field. The energy storage apparatus 105 may include circuitry configured to generate an electrical current when disposed in a location proximate to the magnetic field.

Operation 1004 depicts providing the energy to an energy storage apparatus via a resonant inductive coupling. For example, as shown in FIG. 1, energy generated by the intraluminal generator 100 in response to the movement and/or deformation of the pressure change receiving structure 103 may be transmitted to an energy storage apparatus 105 operably coupled to the intraluminal generator 100 by a resonant inductive coupling 106. The intraluminal generator 100 and the energy storage apparatus 105 may include one or more waveguides configured to transceive evanescent electromagnetic signals. The waveguides may be configured such that a receiving waveguide is in resonance with a transmitting waveguide so as to provide evanescent wave coupling between the waveguides. Upon reception, the evanescent waves may be rectified into DC power for storage in the energy storage apparatus 105.

Operation 1006 depicts providing the energy to an energy storage apparatus via a first resonant inductive coupling in resonance with a second resonant inductive coupling. For example, as shown in FIG. 1, a first intraluminal generator 100 and first energy storage apparatus 105 operably coupled by a first resonant inductive coupling 106 (as described above with respect to operation 1004) may be at least partially co-located with a second intraluminal generator 100 and second energy storage apparatus 105 operably coupled by a second resonant inductive coupling 106 within one or more anatomical structures. In order to avoid destructive interference between the first resonant inductive coupling 106 and the second inductive coupling 106, the waveguides associated with the first resonant inductive coupling 106 and the waveguides associated with the second inductive coupling 106 may be configured so as to be in mutual resonance.

FIG. 9 illustrates alternative embodiments of the example operational flow 700 of FIG. 7. FIG. 9 illustrates example embodiments where the providing operation 710 may include at least one additional operation. Additional operations may include an operation 1102, an/or an operation 1104.

Operation 1102 depicts providing the energy to an at least partially intraluminal energy storage apparatus. For example, as shown in FIG. 1, energy generated by the intraluminal generator 100 in response to the movement and/or deformation of the pressure change receiving structure 103 may be transmitted to an at least partially intraluminal energy storage apparatus 105A via a coupling 106.

Operation 1104 depicts providing the energy to an at least partially extraluminal energy storage apparatus. For example, as shown in FIG. 1, For example, as shown in FIG. 1, energy generated by the intraluminal generator 100 in response to the movement and/or deformation of the pressure change receiving structure 103 may be transmitted to an at least partially extraluminal energy storage apparatus 105B via a coupling 106.

The herein described subject matter may illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method comprising:
   receiving an intraluminal pressure change with an intraluminal, deformable pressure change receiving structure that includes an intraluminal piezoelectric material and that generates an electric current energy under deformation, said intraluminal pressure change associated with an intraluminal fluid, said intraluminal, deformable pressure change receiving structure in physical contact with said intraluminal fluid;
   providing the electric current energy to at least one energy storage apparatus; and
   storing the electric current energy in said at least one energy storage apparatus, said at least one energy storage apparatus being a mechanical energy storage apparatus.

2. A method comprising:
   receiving an intraluminal pressure change with an intraluminal, deformable pressure change receiving structure that includes an intraluminal piezoelectric material and that generates an electric current energy under deformation, said intraluminal pressure change associated with an intraluminal fluid, said intraluminal, deformable pressure change receiving structure in physical contact with said intraluminal fluid;
   providing the electric current energy to at least one energy storage apparatus; and
   storing the electric current energy in said at least one energy storage apparatus, said apparatus being a pressure energy storage apparatus.

3. A method comprising:
   receiving an intraluminal pressure change with an intraluminal, deformable pressure change receiving structure that includes an intraluminal piezoelectric material and that generates an electric current energy under deformation, said intraluminal pressure change associated with an intraluminal fluid, said intraluminal, deformable pressure change receiving structure in physical contact with said intraluminal fluid;
   providing the electric current energy to at least one energy storage apparatus, said providing the electric current energy to at least one energy storage apparatus comprises:
      providing the electric current energy to at least one energy storage apparatus via a mechanical coupling; and
   storing the electric current energy in said at least one energy storage apparatus, said at least one energy storage apparatus selected from at least one of:
      an ultracapacitor, a mechanical energy storage apparatus, a pressure energy storage apparatus, a chemical energy storage apparatus and a fuel cell.

4. A method comprising:
   receiving an intraluminal pressure change with an intraluminal, deformable pressure change receiving structure that includes an intraluminal piezoelectric material and that generates an electric current energy under deformation, said intraluminal pressure change associated with an intraluminal fluid, said intraluminal, deformable pressure change receiving structure in physical contact with said intraluminal fluid;
   providing the electric current energy to at least one energy storage apparatus, said providing the electric current energy to at least one energy storage apparatus comprises:
      providing the electric current energy to at least one energy storage apparatus via a fluid coupling; and storing the electric current energy in said at least one energy storage apparatus, said at least one energy storage apparatus selected from at least one of:
an ultracapacitor, a mechanical energy storage apparatus, a pressure energy storage apparatus, a chemical energy storage apparatus and a fuel cell.

5. A method comprising:
receiving an intraluminal pressure change with an intraluminal, deformable pressure change receiving structure that includes an intraluminal piezoelectric material and that generates an electric current energy under deformation, said intraluminal pressure change associated with an intraluminal fluid, said intraluminal, deformable pressure change receiving structure in physical contact with said intraluminal fluid;
providing the electric current energy to at least one energy storage apparatus, said providing the electric current energy to at least one energy storage apparatus comprises:
providing the electric current energy to at least one energy storage apparatus via an acoustical coupling; and
storing the electric current energy in said at least one energy storage apparatus, said at least one energy storage apparatus selected from at least one of:
an ultracapacitor, a mechanical energy storage apparatus, a pressure energy storage apparatus, a chemical energy storage apparatus and a fuel cell.

6. The method of claim 5, wherein the providing the electric current energy to at least one energy storage apparatus via an acoustical coupling comprises:
providing the electric current energy to at least one energy storage apparatus via a resonant transmitter and receiver.

7. The method of claim 6, wherein the providing the electric current energy to at least one energy storage apparatus via an acoustical coupling comprises:
providing the electric current energy to at least one energy storage apparatus via a resonant transmitter and receiver having a Q factor of at least 10,000.

8. A method comprising:
receiving an intraluminal pressure change with an intraluminal, deformable pressure change receiving structure that includes an intraluminal piezoelectric material and that generates an electric current energy under deformation, said intraluminal pressure change associated with an intraluminal fluid, said intraluminal, deformable pressure change receiving structure in physical contact with said intraluminal fluid;
providing the electric current energy to at least one energy storage apparatus, said providing the electric current energy to at least one energy storage apparatus comprises:
providing the electric current energy to at least one energy storage apparatus via an electromagnetic radiation coupling, said electromagnetic radiation coupling being an optical coupling; and
storing the electric current energy in said at least one energy storage apparatus, said at least one energy storage apparatus selected from at least one of:
an ultracapacitor, a mechanical energy storage apparatus, a pressure energy storage apparatus, a chemical energy storage apparatus and a fuel cell.

9. A method comprising:
receiving an intraluminal pressure change with an intraluminal, deformable pressure change receiving structure that includes an intraluminal piezoelectric material and that generates an electric current energy under deformation, said intraluminal pressure change associated with an intraluminal fluid, said intraluminal, deformable pressure change receiving structure in physical contact with said intraluminal fluid;
providing the electric current energy to at least one energy storage apparatus, said providing the electric current energy to at least one energy storage apparatus comprises:
providing the electric current energy to at least one energy storage apparatus via an electromagnetic radiation coupling, said electromagnetic radiation coupling being an infrared coupling; and
storing the electric current energy in said at least one energy storage apparatus, said at least one energy storage apparatus selected from at least one of:
an ultracapacitor, a mechanical energy storage apparatus, a pressure energy storage apparatus, a chemical energy storage apparatus and a fuel cell.

10. A method comprising:
receiving an intraluminal pressure change with an intraluminal, deformable pressure change receiving structure that includes an intraluminal piezoelectric material and that generates an electric current energy under deformation, said intraluminal pressure change associated with an intraluminal fluid, said intraluminal, deformable pressure change receiving structure in physical contact with said intraluminal fluid;
providing the electric current energy to at least one energy storage apparatus, said providing the electric current energy to at least one energy storage apparatus comprises:
providing the electric current energy to an at least partially intraluminal energy storage apparatus; and
storing the electric current energy in said at least one energy storage apparatus, said at least one energy storage apparatus selected from at least one of:
an ultracapacitor, a mechanical energy storage apparatus, a pressure energy storage apparatus, a chemical energy storage apparatus and a fuel cell.

11. A method comprising:
receiving an intraluminal pressure change with an intraluminal, deformable pressure change receiving structure that includes an intraluminal piezoelectric material and that generates an electric current energy under deformation, said intraluminal pressure change associated with an intraluminal fluid, said intraluminal, deformable pressure change receiving structure in physical contact with said intraluminal fluid;
providing the electric current energy to at least one energy storage apparatus, said providing the electric current energy to at least one energy storage apparatus comprises:
providing the electric current energy to an at least partially extraluminal energy storage apparatus; and
storing the electric current energy in said at least one energy storage apparatus, said at least one energy storage apparatus selected from at least one of:
an ultracapacitor, a mechanical energy storage apparatus, a pressure energy storage apparatus, a chemical energy storage apparatus and a fuel cell.

* * * * *